United States Patent [19]

Merrifield

[11] 4,405,026
[45] Sep. 20, 1983

[54] MOUNTING MECHANISM FOR ENDLESS TRACTION BAND SYSTEM

[75] Inventor: Donald V. Merrifield, Huntsville, Ala.

[73] Assignee: Lockheed Missiles & Space Company, Inc., Sunnyvale, Calif.

[21] Appl. No.: 202,065

[22] Filed: Oct. 30, 1980

[51] Int. Cl.³ .................... B62D 55/08; B62D 55/14
[52] U.S. Cl. .................................. 180/9.62; 305/29
[58] Field of Search ............... 180/9.62, 9.44; 305/20, 305/29

[56] References Cited

U.S. PATENT DOCUMENTS

| | | | |
|---|---|---|---|
| 1,316,092 | 9/1919 | Grover et al. | 180/9.44 X |
| 1,436,651 | 11/1922 | Gilliland | 180/9.44 |
| 1,689,750 | 10/1928 | Redfield | 205/29 X |
| 3,183,987 | 5/1965 | Trombley | 180/9.44 X |
| 3,275,386 | 9/1966 | Bexten | 305/29 X |
| 4,269,457 | 5/1981 | Farrior | 305/11 |
| 4,378,133 | 3/1983 | Trautwein | 305/20 |

FOREIGN PATENT DOCUMENTS 543231  2/1942  United Kingdom .............. 180/9.44

Primary Examiner—Joseph Paul Brust
Attorney, Agent, or Firm—Rodger N. Alleman; Thomas H. Olson

[57] ABSTRACT

A mounting mechanism for an endless traction band system in which the endless band is supported on and driven by a pair of laterally spaced roller chains. The mounting mechanism supports a double sprocket for engaging the chains and is adapted to permit a limited degree of skewing by the sprocket wheel shaft so as to maintain the sprockets in alignment with the roller chains even when the roller chains are deformed in response to laterally imposed loads.

10 Claims, 8 Drawing Figures

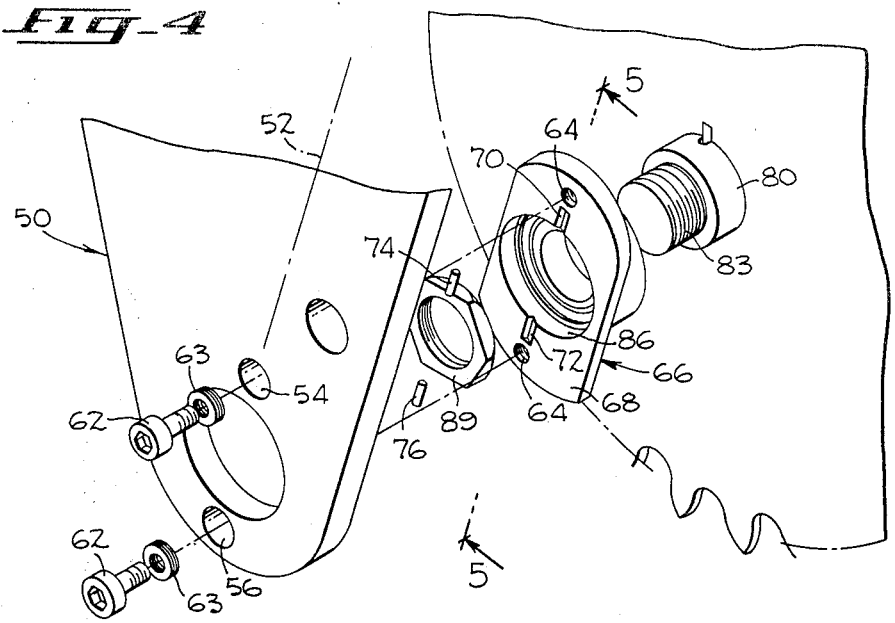
Fig_4
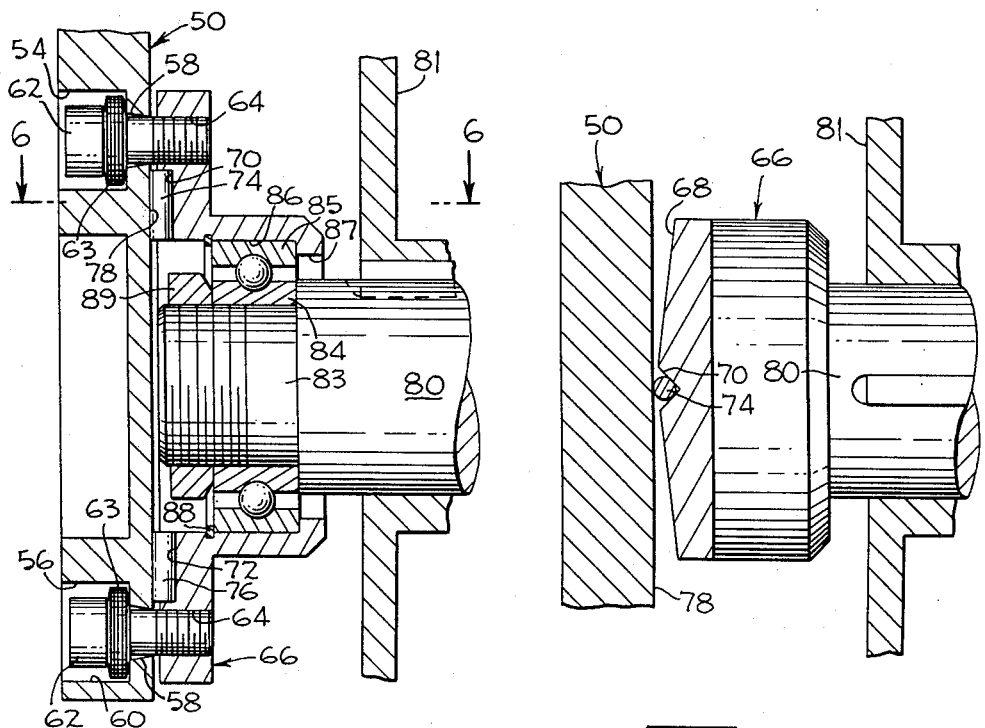
Fig_5
Fig_6

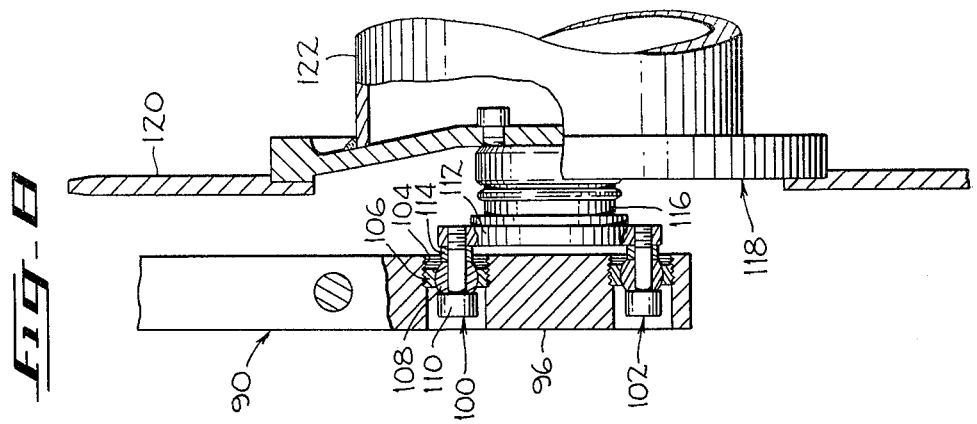
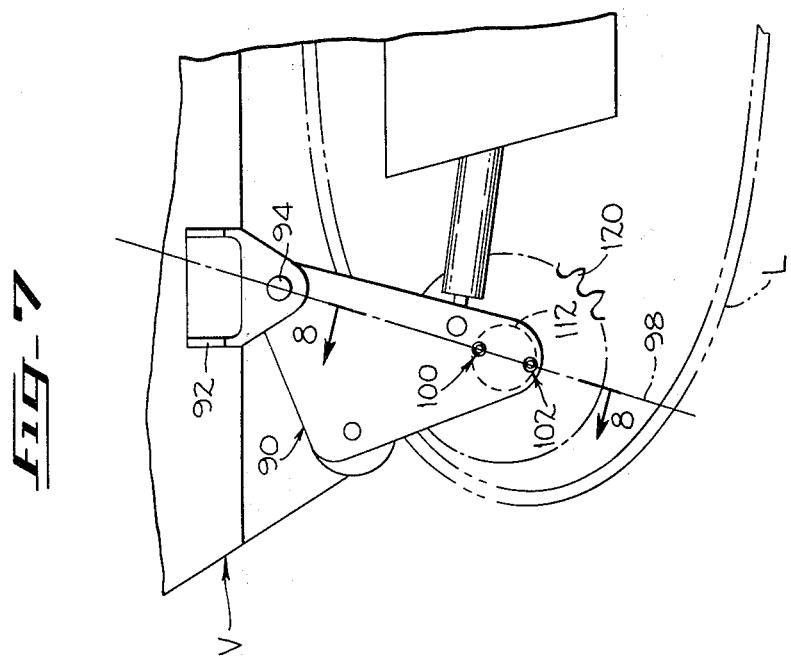

MOUNTING MECHANISM FOR ENDLESS TRACTION BAND SYSTEM

The Government has rights in this invention pursuant to contract number DAAK 30-79C-0057 awarded by the Department of the Army, Tank Automotive Command, Warren, Mich.

BACKGROUND OF THE INVENTION

1. Field of the Invention

This invention relates to a mounting mechanism for an endless band traction system on a vehicle and more particularly to a mounting mechanism that is movable so as reliably to support the endless traction band in the presence of laterally directed loads on the band and the support mechanism therefor.

2. Description of the Prior Art

Endless band traction apparatus exploits the characteristic rigidity of an endless band of resilient material that has a concave-convex cross-sectional shape and which is deformable into a flattened condition for movement on an arcuate path such as formed by a sprocket wheel or like support mechanism. In copending commonly assigned application for U.S. Letters Patent Ser. No. 133,273, filed Mar. 24, 1980 (now U.S. Pat. No. 4,378,133, patented Mar. 29, 1983) as a continuation of Ser. No. 867,428, filed Jan. 6, 1978, now abandoned, there is an edge support structure for an endless traction band which includes roller chains fixed on opposite lateral edges of an endless band. Each roller chain is supported on two or more sprockets which support and drive the roller chains and the band mounted therebetween. This system produces excellent results when the vehicle on which such apparatus is mounted is traversing level terrain. When, however, the vehicle is operating on a slope so that one side of the vehicle is at an elevation different from the other side of the vehicle, there are lateral forces due to gravity imposed on the roller chains and the supporting sprockets which impose transverse loads that are not well accommodated by a chain/sprocket mechanism.

SUMMARY OF THE INVENTION

According to the present invention, one of the endless traction band support mechanism, typically an idler mechanism, is supported between two swing arms that depend from the body of the vehicle on which the endless traction band system is mounted. The swing arms are mounted to the vehicle body for pivotal movement on a common axis which typically extends tranversely of the vehicle. The ends of the arms remote from the common axis support an endless band engaging mechanism such as a pair of spaced apart sprockets, and the connection between the shaft on which the sprockets are carried and the lower ends of the swing arms is adapted to afford at least a limited degree of pivotal movement. The axis of the pivotal movement is on or parallel to an imaginary line that extends between the common axis on which the arms are mounted to the vehicle body and the point of connection between the lower end of the arms and the sprocket shaft so that, when subjected to forces oblique of the common axis, the shaft can skew slightly thereby enhancing engagement between the sprockets and the roller chains that form a part of the endless band mechanism.

Because the roller chain can deviate from a linear path by about ±6° in response to side loading of the endless band, the mechanism is adapted to afford skewing of the sprocket shaft by an equivalent angle.

When a vehicle having endless band traction system is travelling straight on level terrain, the roller chains that form a part of the endless band structure and the sprockets are in aligned coplanar relationship. When, however, the vehicle travels on sloped terrain, lateral loads on the roller chains deform the path of travel of the chains; the sprocket supporting mechanism of the invention permits the sprockets and the shaft on which they are supported to pivot to a limited degree in order to maintain better alignment and engagement between the sprockets and the roller chains that are a part of the endless band traction mechanism.

An object of the invention is to provide a mechanism which maintains enhanced engagement with the roller chains on endless traction band mechanism even in the presence of lateral forces such as exist when the vehicle is traveling on sloped terrain. This object is achieved by providing a pair of parallel swing arms which extend from the vehicle body and by mounting a sprocket shaft at the free end of the arms on a gimbal mount so that the angle of the sprocket shaft can change as the roller chains deviate from a linear path.

Another object of the invention is to provide rugged and trouble-free mechanisms for accomplishing the aforestated object. In one form of the invention there are kingpins or pintles which support opposite ends of the sprocket shaft. The kingpins are supported in gudgeons at the free ends of the swing arms so that the sprocket shaft can skew. In the second form of the invention a gimbal axis or pivot axis is formed by bearing pins that cooperate with grooves in the shaft support bodies and the surfaces of the swing arms. The bearing pins are retained in the grooves by resiliently loaded fasteners which maintain contact between the parts but permit a degree of relative movement. In the third form, spherical or ball joint connections are provided to mount a sprocket shaft bearing to the free ends of the swing arms thereby affording the requisite pivotal movement.

The foregoing, together with other objects, features and advantages, will be more apparent after referring to the following specification and the accompanying drawings.

BRIEF DESCRIPTION OF THE DRAWINGS

FIG. 4 is a fragmentary exploded perspective view showing another embodiment of the invention.

FIG. 5 is an assembled view of the embodiment of FIG. 4 taken substantially on line 5—5 of FIG. 4.

FIG. 6 is a sectional view taken on line 6—6 of FIG. 5.

FIG. 7 is a view similar to FIG. 1 showing still another embodiment of the invention.

FIG. 8 is a sectional view taken substantially on line 8—8 of FIG. 7.

DESCRIPTION OF THE PREFERRED EMBODIMENT

Figure 1:
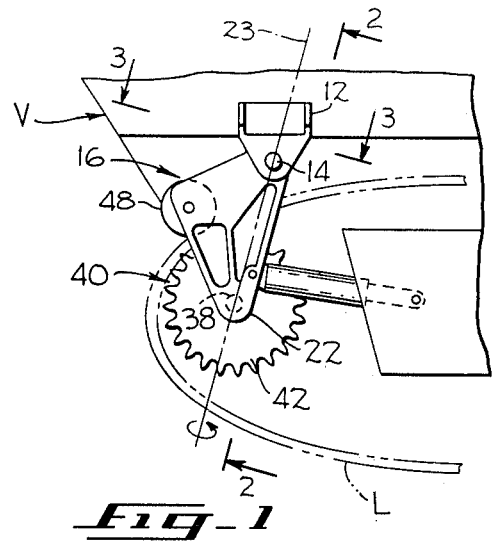
FIG. 1 is a fragmentary side view of a vehicle having an endless traction band support mechanism according to the present invention.
Figure 2:
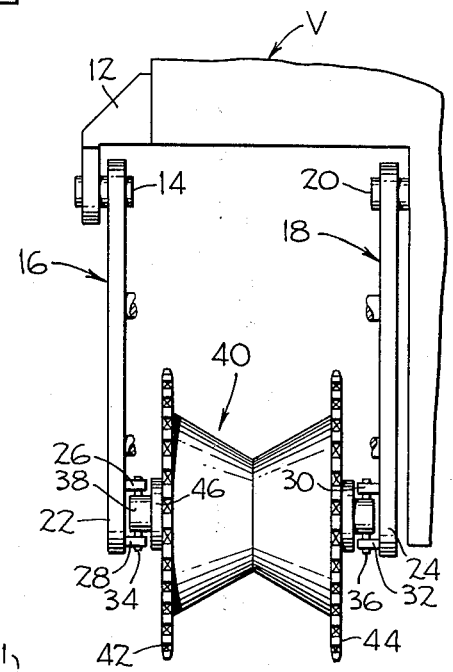
FIG. 2 is a cross-sectional view taken on line 2—2 of FIG. 1.
Figure 3:
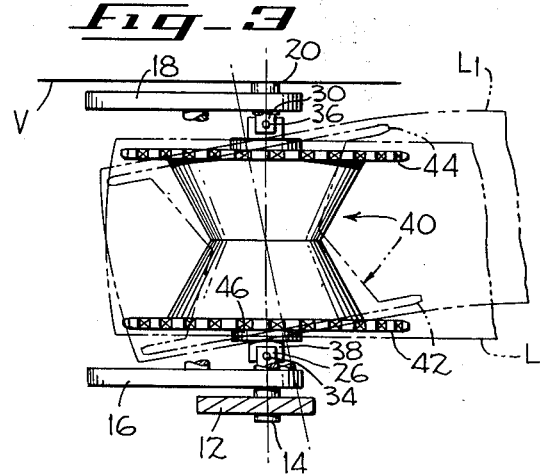
FIG. 3 is a cross-sectional view taken on line 3—3 of FIG. 1.

Referring more particularly to FIGS. 1–3 of the drawings, reference character V indicates a fragment of a vehicle equipped with endless band traction apparatus. Secured rigid with the vehicle is a bracket 12 which supports a pivot pin 14 to which the upper end of a swing arm 16 is mounted for swingable or pivotal movement to vehicle body V. Swing arm 16 is one of a pair, there being a substantially identical swing arm 18 which is joined to the vehicle body V for pivotal movement by a pin 20 that is on a common axis with pin 14.

Reference numeral 22 indicates the lower end of swing arm 16 and as seen in FIG. 1 there is an imaginary line indicated at 23 which extends between the upper end and the lower end of the swing arm. Swing arm 18 has a similar lower end indicated by reference numeral 24 in FIG. 2, there being an imaginary line (not shown) between the upper and lower ends of swing arm 18. Extending inward from swing arm 16 at the lower end thereof is an upper gudgeon 26 and a lower gudgeon 28. Swing arm 18 has equivalent gudgeons 30 and 32, respectively. The gudgeon pairs are bored on a line parallel to imaginary line 23 (and its counterpart and swing arm 18) to receive pintle pins or kingpins 34 and 36. Because the bores in the gudgeons are oriented parallel to imaginary line along the swing arms, the pintle pins are similarly oriented. A shaft 38 is formed at its opposite ends with diametrically extending bores through which kingpins 34 and 36 extend. Thus, the ends of shaft 38 can pivot on an axis parallel to the imaginary lines. In the portion of shaft 38 between swing arms 16 and 18, there is mounted a dual sprocket wheel 40 which has an outer sprocket 42 and an inner sprocket 44. The roller chains (not shown) of an endless band L are engaged with sprockets 42 and 44, and the sprocket wheel is supported for rotation on shaft 38 by means of bearings 46 so that the sprocket wheel is freely rotatable. The disclosure in the above-cited copending application is incorporated hereinto by this reference for its disclosure of a typical endless traction band construction which has an outwardly convex, endless flexible band to opposite sides of which are fixed roller chains which engage idler sprockets 42 and 44 and a pair of driving sprockets spaced from the idler sprockets. The curved cross-sectional shape of the band provides resistance to bending at the ground engaging region thereof; when the band moves around the sprockets, however, it is deformed into a flat condition. As seen in FIG. 1 there is a roller 48 carried on swing arm 16 which urges the roller chains that form a part of band L into engagement with the sprockets. It will also be noted in FIG. 1 that the endless band engages only a limited circumferential portion of sprocket wheel 42 so that alignment between the portion of the band out of engagement with the sprocket and the sprocket is important in effecting engagement of the sprocket teeth with the endless band roller chain.

In operation when the vehicle V is traveling in a straight line on level terrain shaft 38 is oriented approximately perpendicular to swing arms 16 and 18 as shown in the solid line position of FIG. 3. When vehicle V is on a slope such that one side of the vehicle is at an elevation higher than the other side of the vehicle, the endless traction band and sprocket wheel 40 which supports it are subject to substantial relative lateral forces. If the sprockets 42 and 44 were fixed, it would be possible in certain extreme cases for improper engagement between the sprocket teeth and the roller chain to exist. However, because of the gimbal joints joining the sprocket wheel shaft to the lower ends of swing arms 16 and 18, the sprocket wheel can skew from a position transverse of vehicle V into a skewed portion such as that indicated in broken lines in FIG. 3. In such position the sprockets are moved into substantial parallelism with the deformed path followed by the endless band and engagement between the teeth of sprockets 42 and 44 and the roller chains that form a part of the endless band is enhanced.

In further description of the operation of the invention, let it be assumed that the endless band support mechanism seen in FIG. 1 is at the right-hand rear of vehicle V. When the vehicle is traversing a slope such that the right-hand side of the vehicle is lower than the left-hand side of the vehicle, the force of gravity on the vehicle body shifts the weight of the body in a rightward direction, i.e. downhill, and the portion of the endless band in engagement with the terrain resists any such shifting movement. Such lateral loading deforms the portion of the endless band that engages the support mechanism so that the endless band assumes a configuration shown in FIG. 3 at L'. Because the sprocket wheel and the shaft on which it is mounted can skew, good engagement between the teeth of the sprockets and the roller chains on the endless band is maintained.

A second embodiment of the invention is shown in FIGS. 4, 5, and 6. In FIG. 4 a fragment of the outer swing arm, equivalent to swing arm 16 in FIG. 1, is identified at 50. The upper end of swing arm 50 and its counterpart (not shown) are mounted for pivotal movement to the vehicle body and there is an imaginary line 52 that extends between the upper and lower ends of the swing arm. On imaginary line 52 the lower end of swing arm 50 is provided with an upper bore 54 and a lower bore 56. Bore 56, which is exemplary of bore 54, includes, as seen in FIG. 5, an inner tapered portion 58 and an outer counterboard portion 60. Extending through the bores are headed bolts 62, and between the inner annular surface of the head and the bottom surface of counterbore 60 are mounted one or more spring washers or Belleville washers 63 which afford a degree of movement between bolts 62 and the bores in swing arm 50 through which they extend.

Bolts 62 have threaded inner ends which are engaged with suitable threaded holes 64 in a shaft support body 66. Because of the presence of the spring washers 63 and of the taper 58 in bores 54 and 56, body 66 has a degree of movement with respect to swing arm 50. For confining this degree of movement to pivotal movement along an axis parallel to imaginary line 52, shaft support body 66 has an inner surface 68 in which are formed upper and lower V-shaped concave grooves 70 and 72. Disposed in the respective concave grooves 70 and 72 are cylindric-shaped bearing pins 74 and 76. As can be seen most clearly in FIG. 6, the grooves and the bearing pins are dimensioned so that a portion of each bearing pin projects outward of surface 68. The outward projecting portion of each bearing pin 74 and 76 bears on a flat surface 78 formed on the inner surface of swing arm 50. Also seen clearly in FIG. 6 is the fact that surface 68 tapers away from grooves 70 and 72 so as to permit a limited degree of angular movement of body 66 about the projecting portions of bearing pins 74 and 76, the angular movement occurring on an axis which is parallel to imaginary line 52.

Support body 66 supports a shaft 80 on which is mounted a pair of sprocket wheels, one such sprocket wheel being indicated at 81. At each end, shaft 80 is provided with a reduced diameter portion 83 which is supported in an inner race 84 of a ball bearing. The ball bearing has an outer race 85 which is retained in a central bore 86 in shaft support body 66, outer race 86 being captured between a lip 87 and a snap ring 88, both of which project radially into bore 86. Shaft portion 83 is threaded to receive a retaining nut 89 which secures shaft 80 against axial movement.

Operation of the embodiment shown in FIGS. 4–6 is substantially identical to the operation of the embodiment shown in FIGS. 1–3. As lateral loads deform the endless traction band, swing arm 50 and its counterpart (not shown) can pivot to permit shaft 80 to skew and maintain sprocket 81 and its counterpart (not shown) in parallelism with the roller chains that form a part of the endless traction band. Because of the resilience afforded by spring washers 63, body 66 can pivot around the axis formed by the line along which bearing pins 74 and 76 bear against swing arm surface 78. Because of the tapered configuration of surface 68 on body 66, a degree of pivotal movement sufficient to achieve good alignment between the sprockets mounted on shaft 80 and the roller chains is afforded.

A third embodiment of the invention, shown in FIGS. 7 and 8, includes a swing arm 90 which is swingably mounted on vehicle V by a bracket 92 which supports a pivot pin 94. Swing arm 90 has a lower end 96; there is an imaginary line 98 extending from the axis of pivot pin 94 to lower end 96 of the swing arm. On the lower end 96 of the swing arm are two mounting mechanisms 100 and 102 which are spaced from one another on imaginary line 98. Because the mounting mechanisms are identical, description of one will suffice for description of both. Each mounting mechanism includes a threaded bore 104 formed through swing arm 90. Engaged through threaded bore 104 is a member 106 having an outer surface threaded to engage the threads in bore 104 and an inner surface which defines a spherical seat surface. Supported by the spherical seat surface in member 106 is a sphere or ball 108. The fit between the exterior surface of ball 108 and the spherical surface of member 106 is such that the ball can rotate within the member. Ball 108 is centrally bored to receive therethrough a cap screw 110. The inner end of cap screw 110 is threaded and engages a complementally threaded hole in a support body 112. A spacer 114, which is bored to admit cap screw 110 therethrough, is provided for maintaining support body 112 in spaced apart relation to the inner surface of swing arm 90 so as to permit relative movement between ball 108 and member 106. Secured to body 112 is one race of a bearing 116, the other race being fixed to a dual sprocket wheel 118 which includes two sprockets, one of which is identified at 120. A cross shaft 122 is rigidly joined to sprocket 120 and extends to an identical sprocket which engages a roller chain on the opposite side edge of endless band L. The latter sprocket is mounted to swing arm equivalent to swing arm 90 by a mechanism similar to that described next above.

The operation of the embodiment of FIGS. 7 and 8 is substantially identical to that described hereinabove. Movement of body 112 and its opposing counterpart (not shown) is confined to movement on an axis parallel to imaginary line 98, because the body is rigid and because it is engaged by both cap screws 110 that form parts of mounting mechanisms 100 and 102. Thus as the endless band is subjected to lateral loads, body 112 can pivot thereby allowing sprocket wheel 118 to correspondingly pivot and maintain parallelism with the roller chains that form parts of endless band L.

Thus it will be seen that the present invention provides a sprocket wheel mounting mechanism for endless traction band systems which affords excellent support and guidance of the endless band on a straight and level mode of travel and which pivots by a limited amount to permit the sprocket wheels to remain in parallelism with the roller chains on the endless band even when such band distorts in response to lateral forces. Consequently, the likelihood of inadvertent disengagement between the sprockets and the roller chains on the endless band is eliminated and the smoothness of operation and longevity of the mechanisms is improved.

Although several embodiments of the invention have been shown and described, it will be obvious that other adaptations and modifications can be made without departing from the true spirit and scope of the invention.

What is claimed is:

1. In vehicle traction apparatus of the type including an endless traction band having an outer convex surface and an inner concave surface, a first roller chain mounted on one side edge of the band and a second roller chain mounted on the other side edge of the band, said roller chains being of the type that can experience a deviation of up to about +6° from a linear path, an improved mounting mechanism for the endless band comprising first and second spaced apart arms each having an upper end and a lower end, means for mounting the upper ends of said arms to said vehicle so that said arms depend from said vehicle in parallel spaced apart relation, said mounting means affording independent pivotal movement of said arms about a generally horizontal common axis that extends substantially transversely of the vehicle, first and second shaft supports carried at the lower ends of respective said arms, there being imaginary lines extending between respective said mounting means and said shaft supports, said shaft supports each including a body portion and means for securing said body portion to said lower end for pivotal movement about a gimbal axis that is substantially parallel to said imaginary line, and an endless band support member including a shaft mounted to said body portions for rotation relative thereto and extending between said arms, first and second sprockets fixed to said shaft for engaging respective said roller chains, said support member skewing by an amount corresponding to said deviation between a position parallel to said common axis and a position oblique of said common axis in response to side loads imposed on said endless band so as to maintain substantial parallelism between said sprockets and said roller chains.

2. Mounting mechanism according to claim 1 wherein said body portion securing means comprises upper and lower gudgeons fixed to said lower ends of respective said arms, said upper and lower gudgeons defining coaxial bores parallel to respective said imaginary lines, a pintle pin engaged in each said bore, each said pintle pin having a portion intermediate said gudgeons, said shaft extending between said pintle pins, opposite ends of said shaft defining diametrically extending bores for receiving said pintle pins therethrough, the portions of said shaft defining said bores constituting said body portions.

3. Mounting mechanism according to claim 1 wherein each said body portion has a surface and wherein the lower end of each said arm has a surface, means for mounting said body portions to respective said arms so that respective said body surfaces confront respective said arm surfaces to form confronting surface pairs, one surface in each said pair defining at least one concave groove that extends in a direction parallel said imaginary line, a bearing pin disposed in said groove and having a projecting portion for contacting the other surface of said pair along a line parallel to said imaginary line, said body portion mounting means including means extending between said arm and said body portion for resiliently urging said confronting surfaces toward one another and for retaining said bearing pin between said groove and said surface, said body portion including shaft supporting means.

4. Mounting mechanism according to claim 3 wherein said retaining means includes portions of said arm and said body portion defining aligned hole pairs above and below said concave groove, said hole pairs lying on said imaginary line, and means extending through respective said hole pairs for retaining said body portion surface in confronting relation to said arm surface.

5. Mounting mechanism according to claim 4 wherein said retaining means includes a bolt having a head at one end and a threaded portion remote from said head, one hole in said hole pair being threaded to receive said threaded portion of said bolt, and at least one spring washer circumscribing said bolt adjacent said head, said spring washer residing between said head and the margin of the other hole in said hole pair and constituting said resiliently urging means.

6. Mounting mechanism according to claim 1 wherein said body portion securing means includes upper and lower spherical connectors joining said body portion to the lower end of respective said arms, said spherical connectors being disposed on said imaginary line, said body portion including a bearing having a first race and a second race rotatable with respect to said first race, said first race being joined to said pivotal connectors and said second race being joined to said loop wheel support member.

7. In vehicle traction apparatus of the type including an endless traction band having an outer convex surface and an inner concave surface, an improved mounting mechanism for the endless band comprising first and second spaced apart arms each having an upper end and a lower end, means for mounting the upper ends of said arms to said vehicle so that said arms depend from said vehicle in parallel spaced apart relation, said mounting means affording independent pivotal movement of said arms about a common axis that extends substantially transversely of the vehicle, first and second shaft supports carried at the lower ends of respective said arms, there being imaginary lines extending between respective said mounting means and said shaft supports, said shaft supports each including a body portion having a surface, the lower end of each said arm also having a surface, means for mounting said body portions to respective said arms so that respective said body surfaces confront respective said arm surfaces to form confronting surface pairs, one surface in each said pair defining at least one concave groove that extends in a direction parallel said imaginary line, a bearing pin disposed in said groove and having a projecting portion for contacting the other surface of said pair along a line parallel to said imaginary line, said body portion mounting means including means extending between said arm and said body portion for resiliently urging said bearing pin between said groove and said surface, and an endless band support member including a shaft mounted to said body portions for rotation relative thereto and extending between said arms so that said support member can skew by about ±6° between a position parallel to said common axis and a position oblique a said common axis in response to side loads imposed on said endless band.

8. Mounting mechanism according to claim 7 wherein said retaining means includes portions of said arm and said body portion defining aligned hole pairs above and below said concave groove, said hole pairs lying on said imaginary line, and means extending through respective said hole pairs for retaining said body portion surface in confronting relation to said arm surface.

9. Mounting mechanism according to claim 8 wherein said retaining means includes a bolt having a head at one end and a threaded portion remote from said head, one hole in said hole pair being threaded to receive said threaded portion of said bolt, and at least one spring washer circumscribing said bolt adjacent said head, said spring washer residing between said head and the margin of the other hole in said hole pair and constituting said resiliently urging means.

10. In vehicle traction apparatus of the type including an endless traction band having an outer convex surface and an inner concave surface, an improved mounting mechanism for the endless band comprising first and second spaced apart arms each having an upper end and a lower end, means for mounting the upper ends of said arms to said vehicle so that said arms depend from said vehicle in parallel spaced apart relation, said mounting means affording independent pivotal movement of said arms about a common axis that extends substantially transversely of the vehicle, first and second shaft supports carried at the lower ends of respective said arms, there being imaginary lines extending between respective said mounting means and said shaft supports, said shaft supports each including a body portion and means for securing said body portion to said lower end for pivotal movement about a gimbal axis that is substantially parallel to said imaginary line, said body portion securing means including upper and lower spherical connectors joining said body portion to the lower end of respective said arms, said spherical connectors being disposed on said imaginary line, said body portion including a bearing having a first race and a second race rotatable with respect to said first race, said first race being joined to said spherical connectors, and an endless band support member including a shaft having ends mounted to respective said second bearing races for affording rotation of said shaft with respect to said body portions so that said support member can skew by about ±6° between a position parallel to said common axis and a position oblique of said common axis in response to side loads imposed on said endless band thereby to maintain engagement with said endless band.

* * * * *